United States Patent
Tohdoh (10) Patent No.: US 9,057,443 B2
(45) Date of Patent: Jun. 16, 2015

(54) METAL SEAL

(71) Applicant: MITSUBISHI CABLE INDUSTRIES, LTD., Tokyo (JP)

(72) Inventor: Satoshi Tohdoh, Arida (JP)

(73) Assignee: MITSUBISHI CABLE INDUSTRIES, LTD., Tokyo (JP)

( * ) Notice: Subject to any disclaimer, the term of this patent is extended or adjusted under 35 U.S.C. 154(b) by 0 days.

(21) Appl. No.: 13/742,695

(22) Filed: Jan. 16, 2013

(65) Prior Publication Data

US 2013/0187343 A1 Jul. 25, 2013

(30) Foreign Application Priority Data

Jan. 23, 2012 (JP) ................................. 2012-011109

(51) Int. Cl.
*F16J 15/10* (2006.01)
*F16J 15/08* (2006.01)

(52) U.S. Cl.
CPC .............. *F16J 15/08* (2013.01); *F16J 15/0887* (2013.01)

(58) Field of Classification Search
CPC ....... F16J 15/3268; F16J 15/32; F16J 15/061; F16J 15/0887; F16J 15/062; F16J 15/106; F16J 15/064
USPC ......... 277/572, 573, 582, 637, 639, 641, 642, 277/644, 647, 649, 650
See application file for complete search history.

(56) References Cited

U.S. PATENT DOCUMENTS 7,828,302 B2 * 11/2010 Hurlbert et al. ............... 277/637
2009/0206558 A1 * 8/2009 Nameki ........................ 277/644

FOREIGN PATENT DOCUMENTS

JP 2009-24838 A1 2/2009

* cited by examiner

*Primary Examiner* — Gilbert Lee
(74) *Attorney, Agent, or Firm* — Kratz, Quintos & Hanson, LLP (57) ABSTRACT

A metal seal of a non-circular ring which shows uniform sealing ability on whole periphery. The whole configuration of the metal seal is a non-circular ring having an R-shaped curved portion and a straight portion, and a cross-sectional configuration of the metal seal is changed as to make cantilever flexural rigidity larger on the straight portion than on the R-shaped curved portion.

4 Claims, 11 Drawing Sheets

METAL SEAL

BACKGROUND OF THE INVENTION

1. Field of the Invention

This invention relates to a metal seal.

2. Description of the Related Art

Conventionally, a metal seal for sealing two parallel flat faces, of which cross-sectional configuration is U-shaped and whole configuration is circular, is known (refer to Japanese Provisional Publication No. 2009-24838).

When the above-mentioned conventional metal seal is made non-circular as a whole and disposed along a window portion (opening portion) non-circular as a whole to seal the periphery of the non-circular window portion, total sealing ability may be decreased.

Especially, in case of non-circular having an R-shaped curved portion of extremely small radius of curvature, sufficient sealing ability (tight sealing ability) may not be obtained on remaining straight portions.

It is therefore an object of the present invention to provide a metal seal which shows a uniform sealing ability on the whole periphery.

BRIEF DESCRIPTION OF THE DRAWINGS

The present invention will be described with reference to the accompanying drawings in which.

DESCRIPTION OF THE PREFERRED EMBODIMENTS

Preferred embodiments of the present invention will now be described with reference to the accompanying drawings.

Figure 1:
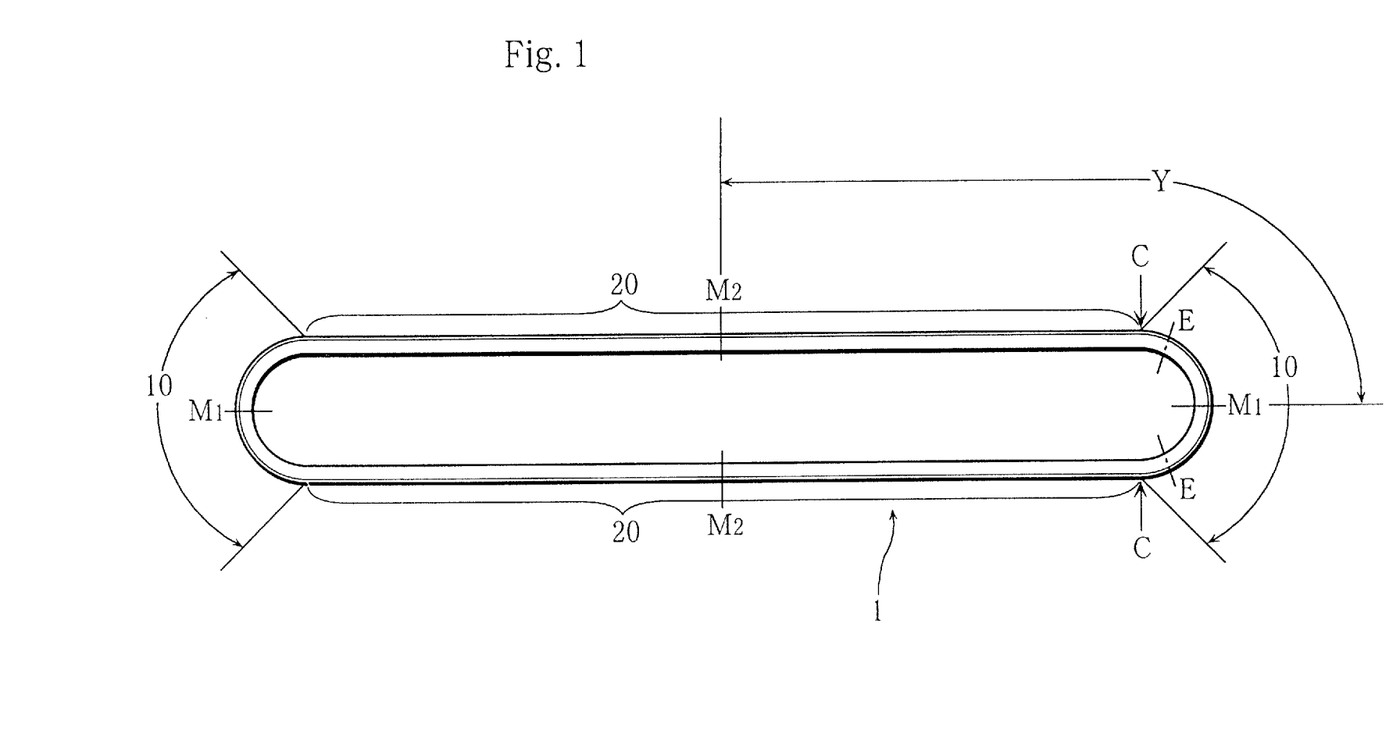
FIG. 1 is a top view for explaining a whole configuration of an example of a metal seal relating to the present invention.
Figure 2:
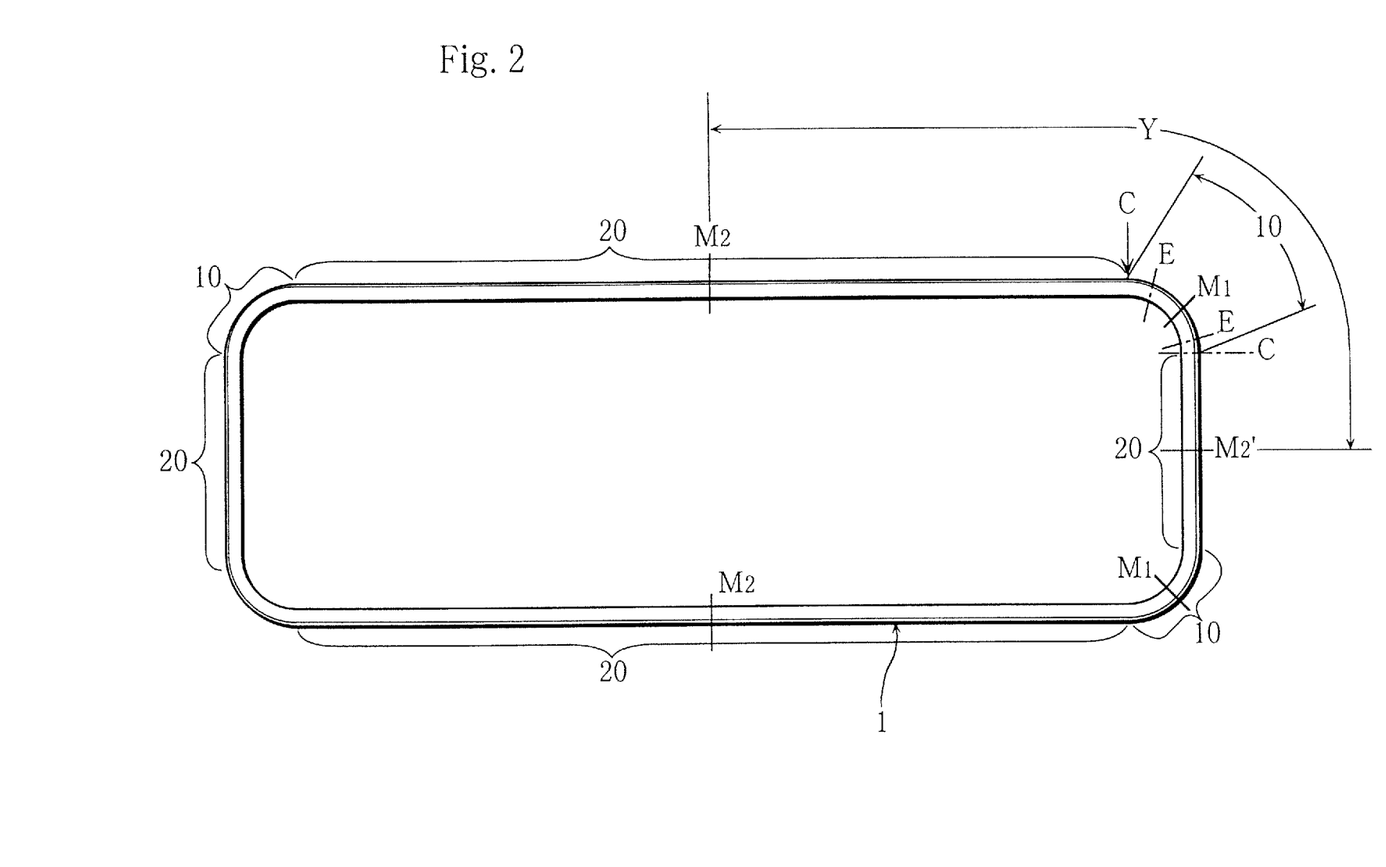
FIG. 2 is a top view for explaining a whole configuration of another example of a metal seal relating to the present invention.

In FIG. 1 or FIG. 2, a metal seal 1 of non-circular closed ring, of which whole configuration has an R-shaped curved portion 10 and a straight side portion (straight portion) 20, is shown. FIG. 1 shows an elongated racing track shape, and FIG. 2 shows a case of rectangular.

FIGS. 4, 5A, 5B, and 5C are cross-sectional views showing the metal seal 1 attached to a rectangular sealing groove 13 formed on a first member 11 to seal between a (flat) bottom face 13A of the sealing groove 13 of the first member 11 and flat face of a second member 12. The metal seal 1 is a so-called U-shaped seal provided with a base portion (bottom wall portion). 3 and a pair of cantilever elastic leg pieces 4 protruding parallel from the base portion 3 in cross section.

The elastic leg piece 4 has a small convex portion 7 for sealing to contact each of two facing parallel flat faces 5 and 6, of which one flat face 5 is corresponding to the bottom face 13A of the first member 11 and another flat face 6 is corresponding to the second member 12. Although the small convex portion 7 has a cross-sectional configuration of round hill, this cross-sectional configuration may be triangular or square.

And, as shown by comparison of FIG. 4 with FIG. 5A, a protruding dimension H of the elastic leg piece 4 is made different on positions in peripheral direction of the metal seal 1 of closed ring as described below. That is to say, in the metal seal 1, the protruding dimension H is made different (with the same outer diameter dimension) by difference of depth dimension of the concave groove 8, and, in FIG. 1 or FIG. 2, a center position $M_1$ (called first center position) of the R-shaped curved portion 10 is made different from a center position $M_2$ and a center position $M_2'$ (called second center position).

Figure 4:
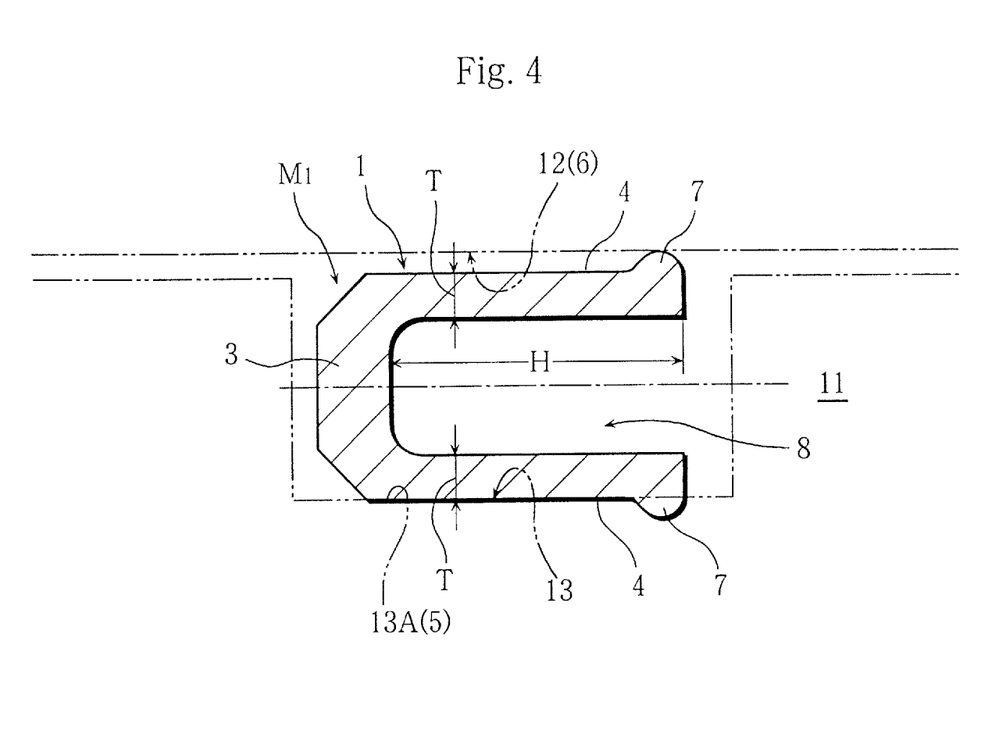
FIG. 4 is a cross-sectional view of a first center position of an R-shaped curved portion showing a first embodiment of the present invention.
Figure 5A:
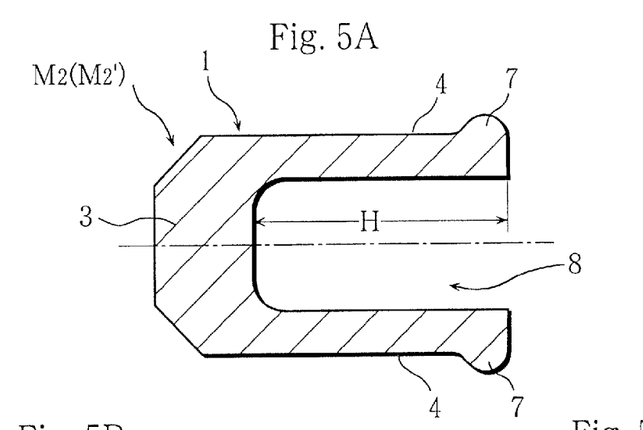
FIG. 5A is a cross-sectional view of a second center position of a straight side portion in the first embodiment.
Figure 10:
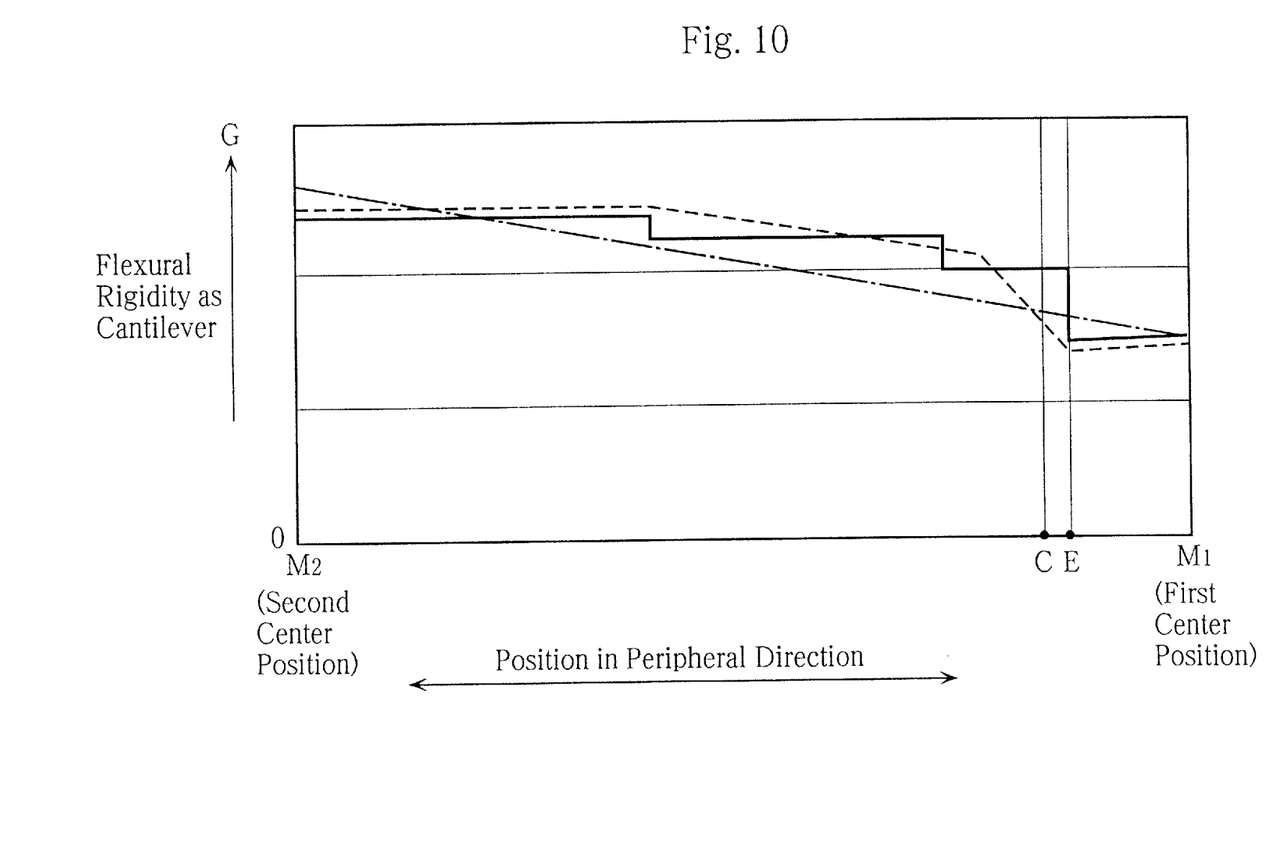
FIG. 10 is a graph showing change of flexural rigidity in a quarter range Y of FIG. 1.
Figure 11:
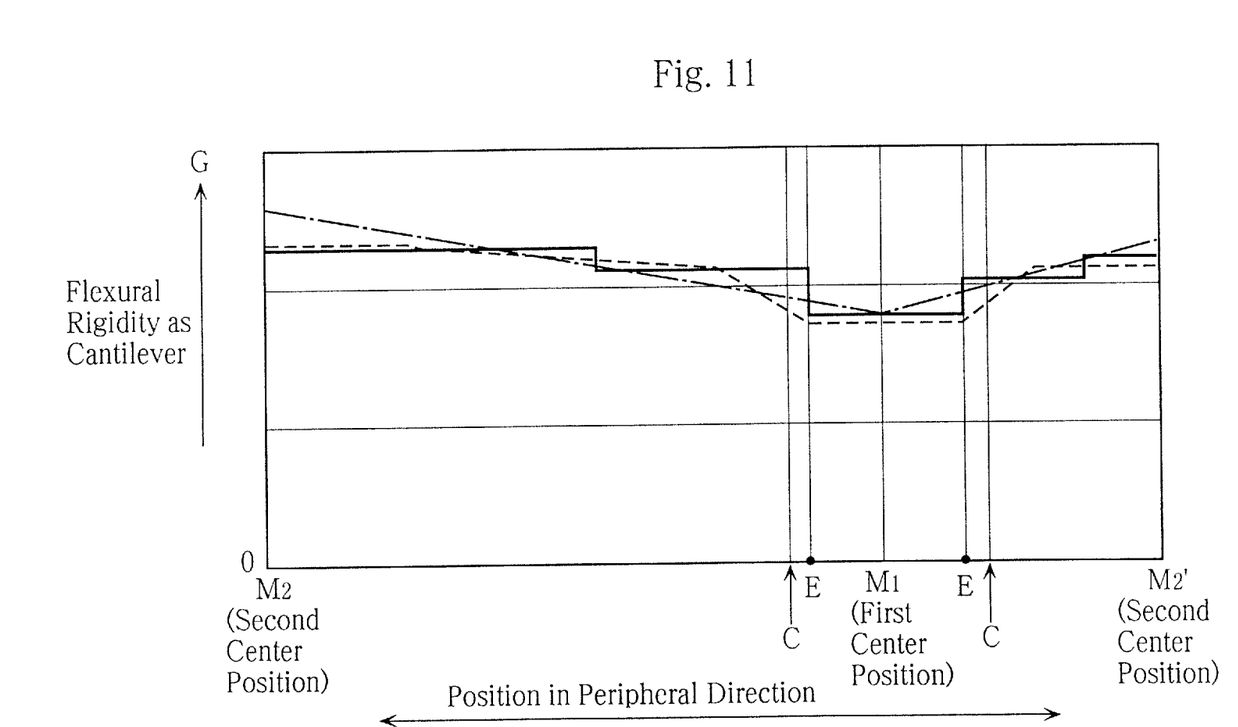
FIG. 11 is a graph showing change of flexural rigidity in the quarter range Y of FIG. 2.

That is to say, FIG. 4 is a cross-sectional face on the first center position $M_1$, and FIG. 5A is a cross-sectional face on the second center positions $M_2$ and $M_2'$ in comparison of FIG. 4 with FIG. 5A, cantilever flexural rigidity G of the cantilever elastic leg piece 4 is larger on the center position $M_2$ and the center position $M_2'$ than on the center position $M_1$, when compared only by cross-sectional configuration because the protruding dimension H in FIG. 4 is large (refer to FIG. 10 or FIG. 11).

In the explanation of the present invention, "cantilever flexural rigidity compared only by cross-sectional configuration" means that the cantilever flexural rigidity is compared, ignoring positions in peripheral direction, only by the cross-sectional configuration while the existence of the R-shaped curved portion 10 influences the cantilever flexural rigidity of the elastic leg piece 4 in the case of non-circular shape of which whole configuration has the R-shaped curved portion 10 as shown in FIG. 1 and FIG. 2, and the cantilever flexural rigidity has to be determined by integration of "the cross-sectional configuration" and "position in peripheral direction within the range of the R-shaped curved portion 10 or how far from the R-shaped curved portion 10" in a real metal seal 1.

Figure 5B:
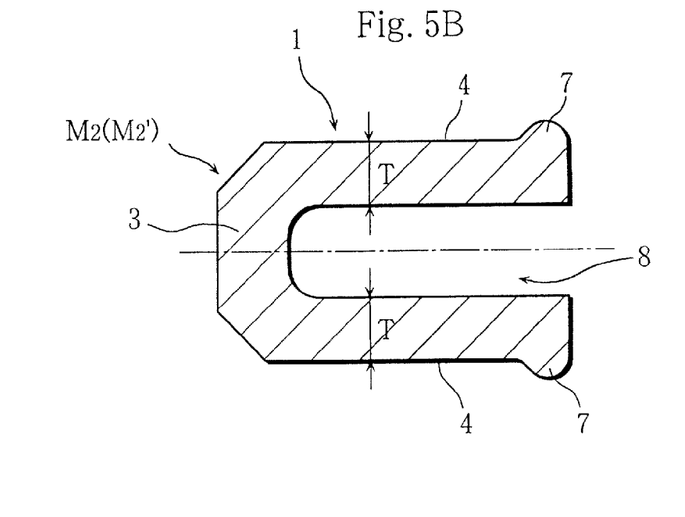
FIG. 5B is a cross-sectional view of the second center position of the straight side portion in the first embodiment.

Next, in FIG. 5B, as clearly shown by comparison with FIG. 4, a thickness dimension T of the elastic leg piece 4 is set to be larger on the second center positions $M_2$ and $M_2'$ of the straight side portion 20 than on the first center position $M_1$ of the R-shaped curved portion 10 shown in FIG. 1 and FIG. 2.

Therefore, the cantilever flexural rigidity G of the cantilever elastic leg piece 4 is larger on the second center positions $M_2$ and $M_2'$ than on the first center position $M_1$, when compared only by the cross-sectional configuration (refer to FIG. 10 or FIG. 11).

Figure 5C:
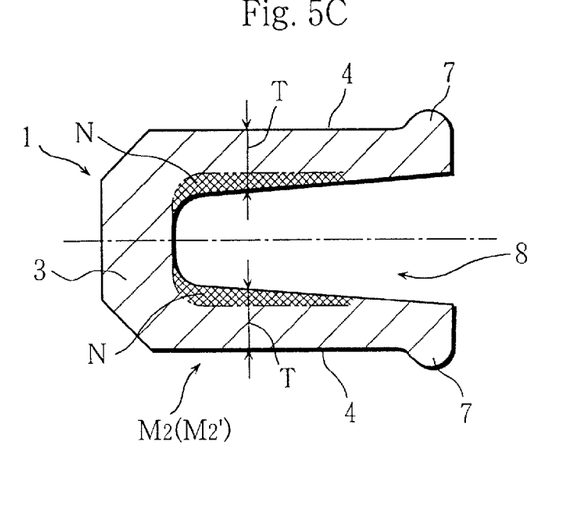
FIG. 5C is a cross-sectional view of the second center position of the straight side portion in the first embodiment.

And, in FIG. 5C, as clearly shown by comparison with FIG. 4, thickness N on leg piece base portion is added to the concave groove 8 side (shown with double hatching in FIG. 5C) as the elastic leg piece 4 increases the thickness dimension T gradually toward the base end 3 side. Therefore, the cantilever flexural rigidity G of the cantilever elastic leg piece 4 is larger on the second center positions $M_2$ and $M_2'$ than on the first center position $M_1$, when compared only by the cross-sectional configuration (refer to FIG. 10 or FIG. 11).

Next, in FIG. 1 and FIG. 10, the metal seal 1, having a configuration of an elongated racing track as a whole, has the R-shaped curved portion 10 of small radius of curvature (ranging 180°) on the left and right of figure and the parallel straight side portions (straight portions) 20 connecting the R-shaped curved portions 10 on the left and right ends, and, FIG. 10 is a graph in which positions in peripheral direction are plotted on the axis of abscissa and the cantilever flexural rigidity G of the elastic leg piece 4 as a cantilever is plotted on the axis of ordinate within a quarter range Y in FIG. 1. The cantilever flexural rigidity G on the axis of ordinate is compared and shown only with the cross-sectional configuration.

As described above, the flexural rigidity G on the first center position $M_1$ is set to be smaller than on the second center position $M_2$. However, how the flexural rigidity G changes (increases) in peripheral direction from the first center position $M_1$ of the R-shaped curved portion 10 to the second center position $M_2$ of the parallel straight side portion 20 is shown with a solid line, a one-dot broken line, and a broken line in FIG. 10. That is to say, the flexural rigidity G is increased gradually (refer to the solid line), slopingly (refer to the one-dot broken line), or gradually and slopingly (refer to the broken line).

In FIG. 1 and FIG. 10, a mark C shows a border of the R-shaped curved portion 10 and the parallel straight side portion 20. In case shown with the solid line in FIG. 10, the same cross-sectional configuration (refer to FIG. 4) is retained to a position E slightly nearing to the first center position $M_1$ from the border C, the cross-sectional configuration is suddenly changed on the position E as to near the configuration of FIG. 5A, 5B, 5C, or a configuration in which FIG. 5A, 5B, 5C are combined, then, proceeds to the second center position $M_2$ with a uniform configuration as clearly shown with the solid line in FIG. 10 (forming a first step), and changes toward the second center position $M_2$ forming plural steps.

Next, in a case shown in FIG. 10 with the one-dot broken line, the cantilever flexural rigidity G is changed from the first center position $M_1$ to the second center position $M_2$ with a continuous sloping increase.

And, in a case shown in FIG. 10 with the broken line, the same cross-sectional configuration is retained to the position E within the R-shaped curved portion 10, the flexural rigidity G is increased from the position E near the border C with two inclination lines having different inclinations, then, the flexural rigidity G reaches for the second center position $M_2$ with the same cross-sectional configuration (same flexural rigidity).

In other words, FIG. 10 is a graph showing the change of the cantilever flexural rigidity G compared only by the cross-sectional configuration, the cross-sectional configuration on the portions on a horizontal line is the same, and the cross-sectional configuration, in case that the cantilever flexural rigidity G changes from small to large, changes from FIG. 4 to one of FIGS. 5A, 5B, and 5C, or a combination of these figures.

Figure 3:
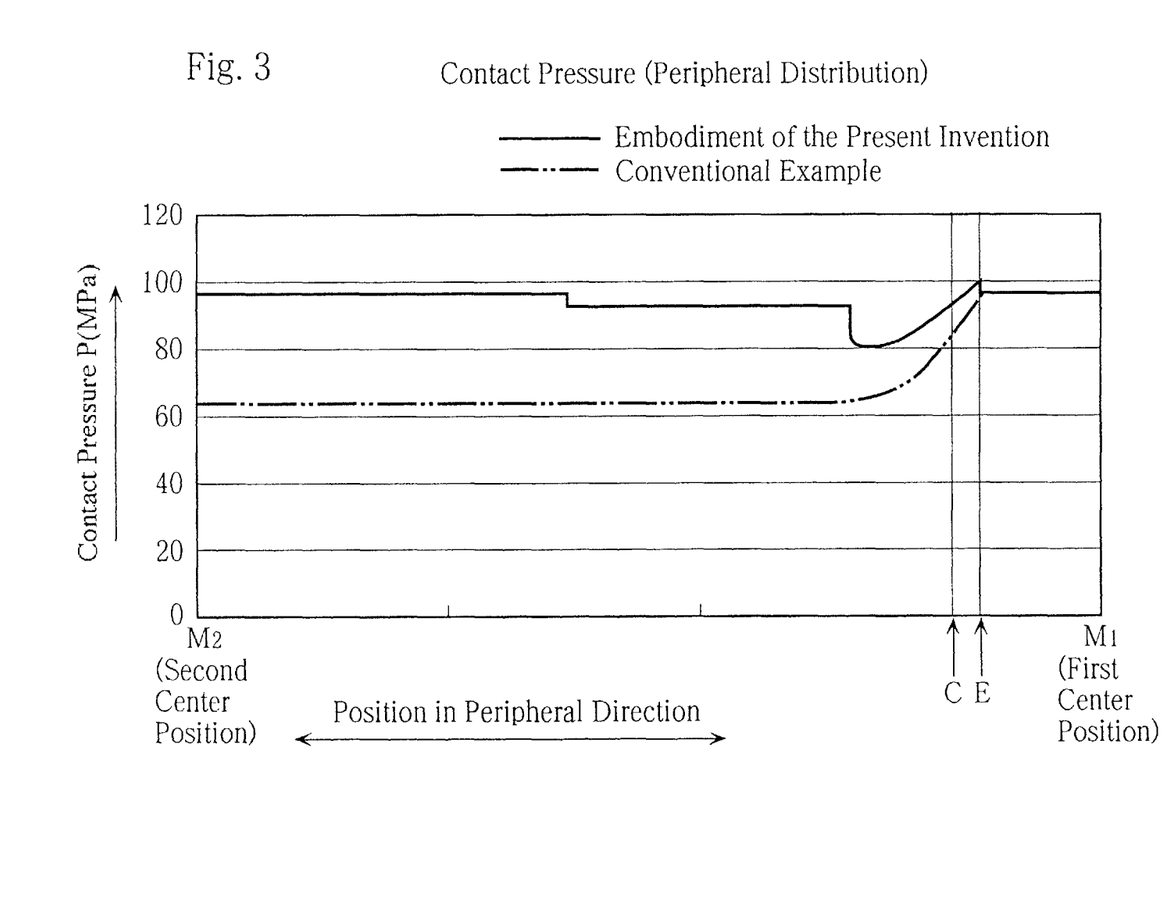
FIG. 3 is a graph showing contact pressure of the present invention and a conventional example with comparison.

The metal seal 1, to which the cross-sectional change (change of the cantilever flexural rigidity G) shown with the solid line in FIG. 10 is given, is in an attached and used state in which the metal seal 1 is press-fit to the flat faces 5 and 6 of the first and second members 11 and 12 as actually shown in FIG. 4, and change of contact pressure P to the flat faces 5 and 6 in the peripheral direction is shown with a solid line in FIG. 3. That is to say, the R-shaped curved portion 10 has higher rigidity as a seal than that of the straight side portion 20 even with the same cross-sectional configuration. On the contrary, the straight side portion 20 has a lower rigidity as a seal than that of the R-shaped curved portion 10 with the same cross-sectional configuration. Therefore, as shown with the solid line in FIG. 10 and the solid line in FIG. 3, the metal seal 1 as a whole has a uniform contact pressure for the whole periphery in comparison with a two-dot broken line showing contact pressure of the conventional metal seal having the same cross-sectional configuration for the whole periphery. Especially, the contact pressure of the second center position $M_2$ of the straight side portion 20 can be sufficiently increased in comparison with the conventional seal, and sealing ability (tight sealing ability) is improved.

In the cases of the one-dot broken line and the broken line in FIG. 10, further-desirable uniform contact pressure may be obtained corresponding to the size of the radius of curvature of the R-shaped curved portion 10 in FIG. 1 and the cross-sectional configuration (dimension) of the metal seal.

Next, in FIG. 2 and FIG. 11, in the metal seal 1, having a rectangular configuration as a whole having the R-shaped curved portion 10 on 4 corner portions, the curved portion 10 forms a center angle of 90° of small radius of curvature, upper and lower sides in FIG. 2 are long straight side portions 20, and left and right sides are short straight side portions 20. FIG. 11 is a graph in which positions in peripheral direction are plotted on the axis of abscissa and the cantilever flexural rigidity G of the elastic leg piece 4 as a cantilever is plotted on the axis of ordinate within a quarter range Y in FIG. 2. The cantilever flexural rigidity G is comparison value only with the cross-sectional configuration as in FIG. 10.

The flexural rigidity G on the first center position $M_1$ is set to be smaller than on the second center positions $M_2$ and $M_2'$. And, the value of the flexural rigidity G is set larger on the second center positions $M_2$ of the straight side portions (upper and lower) 20 forming long sides as in FIG. 11 than on the second center positions $M_2'$ of the straight side portions (left and right) 20 forming short sides. The reason, as shown in FIG. 2, is that the second center position $M_2'$ of the left and right straight side portions 20 forming short sides is nearer to the R-shaped curved portion 10 and easily influenced by the highness of rigidity of the R-shaped curved portion 10, so the cantilever flexural rigidity G on the second center position $M_2'$ of the left and right sides is set to be slightly lower.

And, a solid line, an one-dot broken line, and a broken line in FIG. 11 change gradually, slopingly, or gradually and slopingly as to correspond to the (above-described) solid, one-dot broken, and broken lines shown in FIG. 10. Further, positional relationship of the border C and the gradually-changing position E is similar to that of FIG. 10 and its explanation is omitted. And, similar to the case described with FIG. 3, uniform contact pressure is generated under used state on the whole periphery by changing the cross-sectional configuration and dimension as shown in FIG. 11, and sealing ability (tight sealing ability) is improved in comparison with the conventional seal.

Next, to describe a second embodiment shown in FIG. 6 and FIGS. 7A through 7C, this metal seal 1 has a cross-sectional configuration called K-shaped, the base portion 3 (bottom wall portion) is approximately octagonal, and a pair of cantilever elastic leg pieces 4 are protruding from the base portion 3 as to open toward forth ends.

The small convex portion 7 for sealing on the forth end of the elastic leg piece 4 is attached to each of the facing flat faces 5 and 6. The small convex portion 7 may be formed small round shape and small triangular shape not shown in figures.

Figure 6:
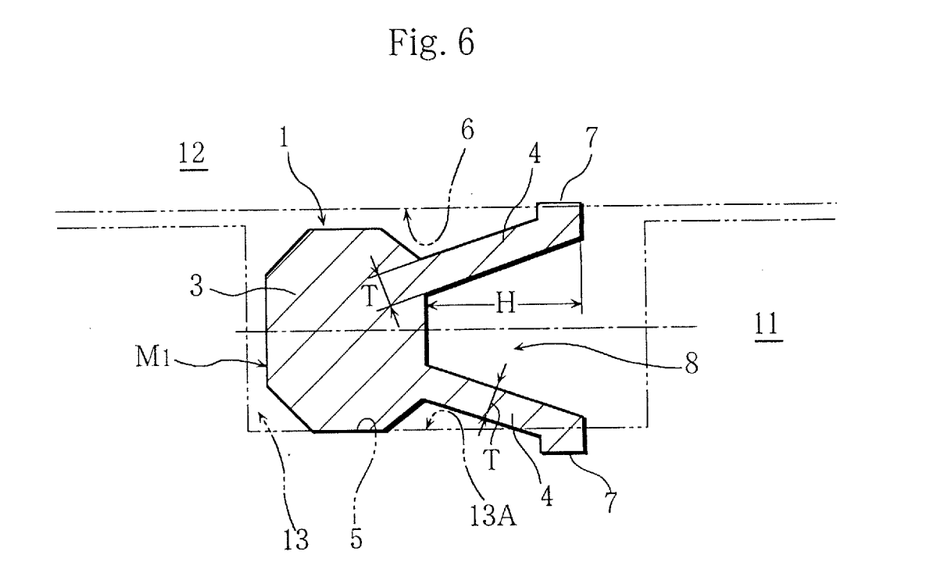
FIG. 6 is a cross-sectional view of the first center position of the R-shaped curved portion showing a second embodiment.
Figure 7A:
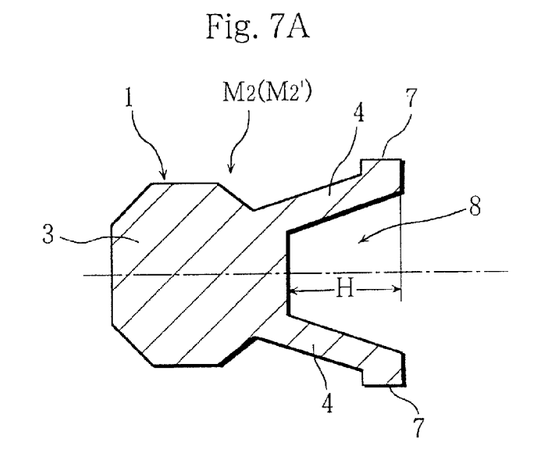
FIG. 7A is a cross-sectional view of the second center position of the straight side portion in the second embodiment.

As clearly shown by comparison of FIG. 6 with FIG. 7A, the protruding dimension H of the elastic leg piece 4 is changed, and the protruding dimension H is set smaller on the center position $M_2$ and the center position $M_2'$ of the straight side portion 20 than on the center position $M_1$ of the R-shaped curved portion 10 in the entire configuration shown in FIG. 1 or FIG. 2. Therefore, the flexural rigidity G of the cantilever elastic leg piece 4 is larger on the center position $M_2$ and the center position $M_2'$ than on the center position $M_1$ when compared only by cross-sectional configuration (refer to FIG. 10 or FIG. 11).

Figure 7B:
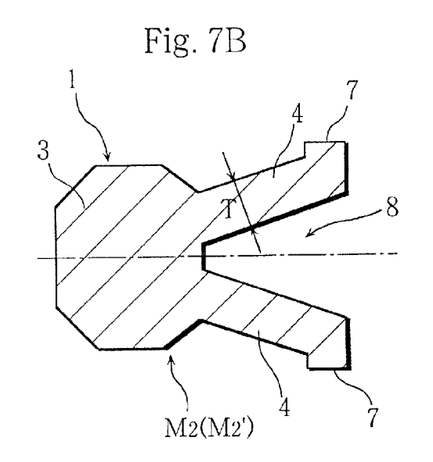
FIG. 7B is a cross-sectional view of the second center position of the straight side portion in the second embodiment.

And, in FIG. 7B, as clearly shown by comparison with FIG. 6, the thickness dimension T of the elastic leg piece 4 is set to be larger on the second center positions $M_2$ and $M_2'$ than on the first center position $M_1$ shown in FIG. 1 and FIG. 2. Therefore, the cantilever flexural rigidity G is larger on the second center positions $M_2$ and $M_2'$ than on the first center position $M_1$, when compared only by the cross-sectional configuration (refer to FIG. 10 or FIG. 11).

Figure 7C:
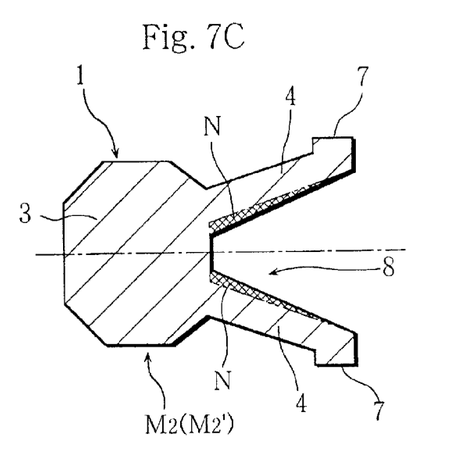
FIG. 7C is a cross-sectional view of the second center position of the straight side portion in the second embodiment.

And, in FIG. 7C, as clearly shown by comparison with FIG. 6, the thickness N on leg piece base portion is added to the concave groove 8 side (shown with double hatching in FIG. 7C) as the elastic leg piece 4 increases the thickness dimension T gradually toward the base end 3 side. Therefore, the cantilever flexural rigidity G is set larger on the second center positions $M_2$ and $M_2'$ than on the first center position $M_1$, when compared only by the cross-sectional configuration (refer to FIG. 10 or FIG. 11).

Next, to describe a third embodiment shown in FIG. 8 and FIGS. 9A through 9C, this metal seal 1, having a cross-sectional configuration of laid U-shaped, is unitedly formed with the rather thick base portion (bottom wall portion) 3 and a pair of cantilever elastic leg pieces 4 protruding from the base portion 3 as to be parallel or opening toward forth ends. The small convex portion 7 for sealing of small triangle is formed on the forth end of the elastic leg piece 4.

Figure 8:
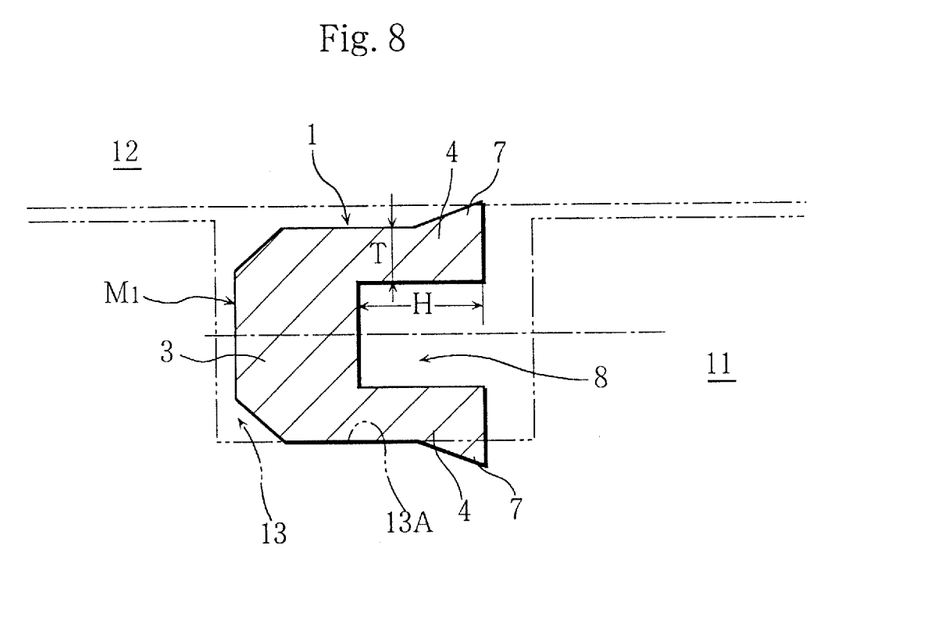
FIG. 8 is a cross-sectional view of the first center position of the R-shaped curved portion showing a third embodiment.
Figure 9A:
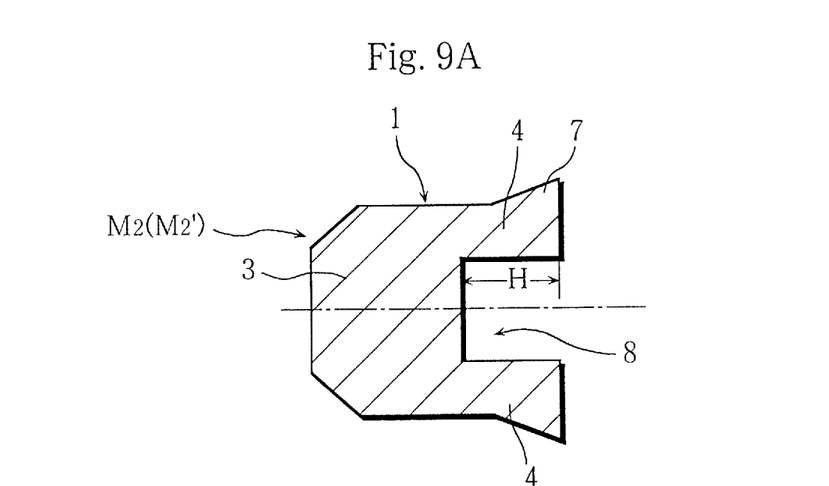
FIG. 9A is a cross-sectional view of the second center position of the straight side portion in the third embodiment.
Figure 9B:
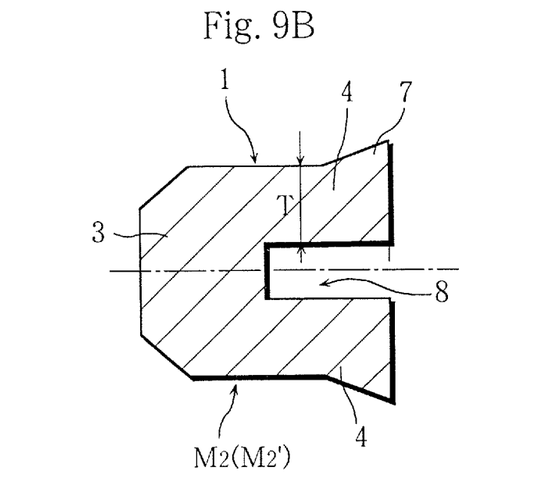
FIG. 9B is a cross-sectional view of the second center position of the straight side portion in the third embodiment.
Figure 9C:
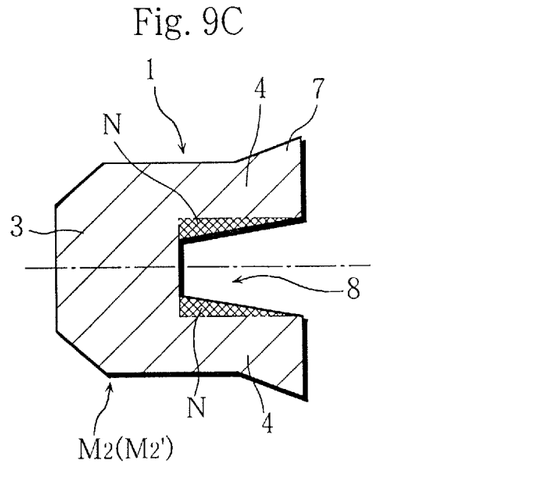
FIG. 9C is a cross-sectional view of the second center position of the straight side portion in the third embodiment.

FIGS. 9A, 9B, and 9C respectively correspond to FIGS. 5A, 5B, and 5C, or FIGS. 7A, 7B, and 7C, and, the protruding dimension H, the thickness dimension T, and the thickness N on leg piece base portion are similarly changed when compared with FIG. 8. The construction and function are similar to that of FIGS. 4 through 5C or FIGS. 6 through 7C.

The present invention, being modifiable, the entire configuration of the metal seal may be triangular, U-shaped, or inverted T-shaped. And, in FIG. 1 and FIG. 2, the case that the concave groove 8 in the cross section shown in FIGS. 4 through 9C is directed inward of the entire ring and the other case that the concave groove 8 is directed outward are selected corresponding to usage. And, in FIG. 10 or FIG. 11, the number of steps of the gradual change shown with the solid line may be freely increased and decreased, and it is also preferable to change to draw a gentle curved line in the graph when changing with a sloping change (inclination line). And two or three of A, B, and C may be freely combined in FIGS. 5A through 5C, FIGS. 7A through 7C, or FIGS. 9A through 9C.

The present invention, as described above, characterized by that the cross-sectional configuration of the metal seal is ununiform for the entire periphery in the metal seal of which entire configuration is a closed ring, can improve the sealing ability as a whole by making the contact pressure uniform for the entire periphery.

And, the contact pressure P on the straight side portion 20 can be increased, fluid leakage from the straight side portion 20 is prevented, and the sealing ability of the entire metal seal can be improved because the present invention is the metal seal provided with the base portion 3, and the pair of cantilever elastic leg pieces 4 protruding from the base portion 3 as to be parallel or opening toward the forth ends, each of which has the small convex portion 7 for sealing on the forth end to contact each of the facing two flat faces 5 and 6, and having the construction in which the entire configuration is the non-circular ring having the R-shaped curved portion 10 and the straight side portion 20, at least one of the protruding dimension H, the thickness dimension T, and the thickness N of leg piece base portion of the cantilever elastic leg piece 4 is made different on the first center position $M_1$ of the R-shaped curved portion 10 and on the second center positions $M_2$ and $M_2'$ of the straight side portion 20, and the cantilever flexural rigidity G of the cantilever elastic leg piece 4 is set larger on the second center positions $M_2$ and $M_2'$ than on the first center position $M_1$ when compared only by cross-sectional configurations. Especially, the metal seal shows excellent sealing ability (tight sealing ability) as a metal seal having the configurations of elongated racing track and long rectangular having the R-shaped curved portion 10 of small radius of curvature. Or, in case that the facing parallel two flat faces 5 and 6 are easily damaged, there is an advantage of reducing fastening force. That is to say, the contact pressure of the R-shaped curved portion 10 can be reduced by lowering the rigidity of the R-shaped curved portion 10.

And, the metal seal can be press-fit to the flat faces 5 and 6 with further uniform contact pressure P for the whole periphery, and the sealing ability of the entire seal can be improved because the cantilever flexural rigidity G compared only by cross-sectional configurations is increased gradually and/or slopingly from the first center position $M_1$ of the R-shaped curved portion 10 to the second center position $M_2$ of the straight side portion 20, and the cantilever flexural rigidity G is set larger on the second center position $M_2$ than on the first center position $M_1$.

While preferred embodiments of the present invention have been described in this specification, it is to be understood that the invention is illustrative and not restrictive, because various changes are possible within the spirit and indispensable features.

What is claimed is:

1. A metal seal provided with a base portion, and a pair of cantilever elastic leg pieces protruding from the base portion as to be parallel or opening toward forth ends, each of which has a small convex portion for sealing on the forth end to contact each of facing two flat faces, comprising a construction in which an entire configuration is a non-circular ring having an R-shaped curved portion and a straight side portion, at least one of a protruding dimension, a thickness dimension, and a thickness of leg piece base portion of the cantilever elastic leg piece is made different on a first center position of the R-shaped curved portion and on second center position of the straight side portion, and cantilever flexural rigidity of the cantilever elastic leg piece is set larger on the second center position than on the first center position when compared only by cross-sectional configurations, a cantilever flexural rigidity of the metal seal being ununiform for an entire periphery, the second center position and the first center position being located at different positions around the metal seal.

2. The metal seal as set forth in claim 1, wherein the cantilever flexural rigidity compared only by cross-sectional configurations is increased gradually and/or slopingly from the first center position of the R-shaped curved portion to the second center position of the straight side portion, and the cantilever flexural rigidity is set larger on the second center position than on the first center position.

3. A metal seal, of which entire configuration is a closed non-circular ring having an R-shaped curved portion and a straight side portion to seal by contact with each of two facing flat faces, comprising a construction in which a cross-sectional configuration of a cantilever flexural rigidity of the metal seal is ununiform for an entire periphery as to make contact pressure of the metal seal against each of the two flat faces uniform for the entire periphery, wherein the cantilever flexural rigidity compared only by cross-sectional configurations is increased in at least one of gradual manner and sloping manner from the first center position of the R-shaped curved portion to the second center position of the straight side portion, the second center position and the first center position being located at different positions around the metal seal.

4. The metal seal as set forth in claim 3, wherein the cantilever flexural rigidity is set larger on the second center position than on the first center position.

\* \* \* \* \*